(12) United States Patent
Yamazaki

(10) Patent No.: US 11,332,123 B2
(45) Date of Patent: May 17, 2022

(54) VEHICLE TRAVEL CONTROL SYSTEM FOR PARKING LOT, AND CONTROL METHOD OF VEHICLE TRAVEL CONTROL SYSTEM FOR PARKING LOT

(71) Applicant: Panasonic Intellectual Property Management Co., Ltd., Osaka (JP)

(72) Inventor: Masanao Yamazaki, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 196 days.

(21) Appl. No.: 16/554,617

(22) Filed: Aug. 29, 2019

(65) Prior Publication Data

US 2019/0382002 A1  Dec. 19, 2019

Related U.S. Application Data

(63) Continuation of application No. PCT/JP2018/006138, filed on Feb. 21, 2018.

(30) Foreign Application Priority Data

Mar. 6, 2017  (JP) .............................. JP2017-042172

(51) Int. Cl.
*B60W 30/06* (2006.01)
*B60W 30/085* (2012.01)
(Continued)

(52) U.S. Cl.
CPC .......... *B60W 30/06* (2013.01); *B60W 30/085* (2013.01); *B60W 30/0956* (2013.01);
(Continued)

(58) Field of Classification Search
CPC ............... B60W 30/06; B60W 30/085; B60W 2554/00; B60W 30/0956; G05D 1/0022; G05D 1/0289
See application file for complete search history.

(56) References Cited

U.S. PATENT DOCUMENTS

2010/0156672 A1\* 6/2010 Yoo ......................... G08G 1/14
340/932.2
2015/0353080 A1  12/2015 Mukaiyama
(Continued)

FOREIGN PATENT DOCUMENTS

JP   2015-230641   12/2015
JP     5983680 B    9/2016

OTHER PUBLICATIONS

International Search Report of PCT application No. PCT/JP2018/006138 dated May 15, 2018.

*Primary Examiner* — Dale W Hilgendorf
*Assistant Examiner* — Toya Pettiegrew
(74) *Attorney, Agent, or Firm* — Greenblum & Bernstein, P.L.C.

(57) ABSTRACT

A vehicle travel control system for a parking lot controls traveling of at least a first vehicle and a second vehicle through at least a first radio communication circuit and a second radio communication circuit. The vehicle travel control system for a parking lot causes the first vehicle to travel in a direction of moving away from a third vehicle along a first traveling direction and causes the second vehicle to travel between the first vehicle and the third vehicle when the following conditions are satisfied: the first vehicle is stopped in a parking area, the third vehicle is stopped in a passage area adjacent to the parking area to stand still on a path in the first traveling direction in which the first vehicle travels, the first vehicle stopped in the parking area is in a given state, the third vehicle stopped in (Continued)

the passage area is not in the given state, a first distance measured by the first vehicle is smaller than a given width of the second vehicle, and a sum of the first distance and second distance measured by the first vehicle is larger than the given width of the second vehicle.

13 Claims, 9 Drawing Sheets

(51) Int. Cl.
*B60W 30/095* (2012.01)
*G05D 1/00* (2006.01)
*G05D 1/02* (2020.01)

(52) U.S. Cl.
CPC ......... *G05D 1/0022* (2013.01); *G05D 1/0088* (2013.01); *G05D 1/0289* (2013.01); *B60W 2554/00* (2020.02)

(56) References Cited

U.S. PATENT DOCUMENTS

| | | | |
|---|---|---|---|
| 2017/0116862 A1* | 4/2017 | Inoue | G08G 1/161 |
| 2017/0118307 A1* | 4/2017 | Beaurepaire | G08G 1/144 |
| 2017/0166115 A1* | 6/2017 | Pal | G08G 1/163 |
| 2018/0099663 A1* | 4/2018 | Diedrich | B60W 30/09 |
| 2018/0178789 A1* | 6/2018 | Nishimura | G08G 1/161 |

* cited by examiner

VEHICLE TRAVEL CONTROL SYSTEM FOR PARKING LOT, AND CONTROL METHOD OF VEHICLE TRAVEL CONTROL SYSTEM FOR PARKING LOT

CROSS-REFERENCE TO RELATED APPLICATIONS

This application is a continuation application of the PCT International Application No. PCT/JP2018/006138 filed on Feb. 21, 2018, which claims the benefit of foreign priority of Japanese patent application No. 2017-042172 filed on Mar. 6, 2017, the contents all of which are incorporated herein by reference.

BACKGROUND

1. Technical Field

The present disclosure relates to a vehicle travel control system for a parking lot and a control method of a vehicle travel control system for a parking lot.

2. Description of the Related Art

Automated valet parking is carried out such that an occupant gets out of a vehicle at an entrance gate of a parking lot and the vehicle under autonomous driving control parks autonomously in a parking space in the parking lot. When the vehicle develops trouble or comes in contact with an obstacle and comes to a standstill in a passage in the midst of a parking process, the vehicle makes it impossible for a different vehicle having entered the parking lot right after the vehicle to run through the passage. This may hamper operation and management of the parking lot. To avoid such a situation, the vehicle having developed trouble is caused to run autonomously to a retreat location (see, for example, Unexamined Japanese Patent Publication No. 2015-230641).

SUMMARY

The present disclosure provides a technique by which, even if a vehicle cannot move due to some trouble, its influence on traveling of a different vehicle is reduced.

A vehicle travel control system for a parking lot according to one aspect of the present disclosure, the vehicle travel control system includes a first vehicle, a second vehicle, and a third vehicle. The first vehicle has a first radio communication circuit and is configured to be externally controlled in traveling. The first vehicle is configured to measure a first distance to an obstacle in a first direction along a first traveling direction and a second distance to an obstacle in a second direction opposite to the first direction along the first traveling direction. The second vehicle has a second radio communication circuit and is configured to be externally controlled in traveling. The second vehicle has a given width in a direction perpendicular to a second traveling direction. The vehicle travel control system for a parking lot controls traveling of at least the first vehicle and the second vehicle through at least the first radio communication circuit and the second radio communication circuit. When the following conditions are satisfied, the vehicle travel control system for a parking lot causes the first vehicle to travel in a direction of moving away from the third vehicle along the first traveling direction and causes the second vehicle to travel between the first vehicle and the third vehicle.

(1-1) The first vehicle is stopped in a parking area.
(1-2) The third vehicle is stopped in a passage area adjacent to the parking area to stand still on a path in the first traveling direction in which the first vehicle travels.
(1-3) The first vehicle stopped in the parking area is in a given state.
(1-4) The third vehicle stopped in the passage area is not in the given state.
(2-1) The first distance measured by the first vehicle is smaller than the given width of the second vehicle.
(2-2) A sum of the first distance and second distance measured by the first vehicle is larger than the given width of the second vehicle.

Another aspect of the present disclosure is directed to a control method of a vehicle travel control system for a parking lot. The vehicle travel control system for a parking lot includes a first vehicle, a second vehicle, and a third vehicle. The first vehicle has a first radio communication circuit and is configured to be externally controlled in traveling. The first vehicle is configured to measure a first distance to an obstacle in a first direction along a first traveling direction and a second distance to an obstacle in a second direction opposite to the first direction along the first traveling direction. The second vehicle has a second radio communication circuit and is configured to be externally controlled in traveling. The second vehicle has a given width in a direction perpendicular to a second traveling direction. The vehicle travel control system for a parking lot controls traveling of at least the first vehicle and the second vehicle through at least the first radio communication circuit and the second radio communication circuit. When the following conditions are satisfied, the control method causes the first vehicle to travel in a direction of moving away from the third vehicle along the first traveling direction and causes the second vehicle to travel between the first vehicle and the third vehicle.

(1-1) The first vehicle is stopped in a parking area.
(1-2) The third vehicle is stopped in a passage area adjacent to the parking area to stand still on a path in the first traveling direction in which the first vehicle travels.
(1-3) The first vehicle stopped in the parking area is in a given state.
(1-4) The third vehicle stopped in the passage area is not in the given state.
(2-1) The first distance measured by the first vehicle is smaller than the given width of the second vehicle.
(2-2) A sum of the first distance and second distance measured by the first vehicle is larger than the given width of the second vehicle.

Any given combination of the above constituent elements and modifications of the features of the present disclosure in methods, devices, systems, recording media, and computer programs are still effective as other aspects of the present disclosure.

According to the present disclosure, even if a vehicle cannot move due to some trouble, its influence on traveling of a different vehicle is reduced.

DETAILED DESCRIPTION OF PREFERRED EMBODIMENTS

Before description of an exemplary embodiment according to the present disclosure, a problem found in a conventional technique will be described briefly. When a vehicle cannot move due to some trouble, it cannot be caused to travel autonomously to a retreat location. A parking lot, therefore, cannot be used until an administrator of the parking lot or a person from a repair shop displaces the vehicle.

The present disclosure will be outlined before it is described specifically. The exemplary embodiment according to the present disclosure relates to a vehicle travel control system for a parking lot that controls traveling of a vehicle in a parking lot, the vehicle being configured to be externally controlled in its traveling. According to the vehicle travel control system for a parking lot, a vehicle that intends to enter a parking lot (which will hereinafter be referred to as "entering vehicle"), for example, lets an occupant get out of the vehicle at an entering/leaving gate of the parking lot, and, when receiving an instruction on a parking space from a management server configured to communicate with the vehicle, executes a process of parking in the parking space. As mentioned above, if the vehicle stops in a passage due to some trouble in the midst of a parking process and cannot move, the vehicle in such a state has an influence on traveling of a different vehicle. To reduce such an influence, the vehicle travel control system for a parking lot according to the exemplary embodiment causes a vehicle parked near the vehicle having developed trouble (the former vehicle will hereinafter be referred to as "parked vehicle" and the latter one as "disabled vehicle") to move, and thereby forms a route for the different vehicle to travel through between the parked vehicle and the disabled vehicle. The management server can perform such control, and any one of the disabled vehicle, the parked vehicle, and the entering vehicle can perform the same control as well.

Figure 1:
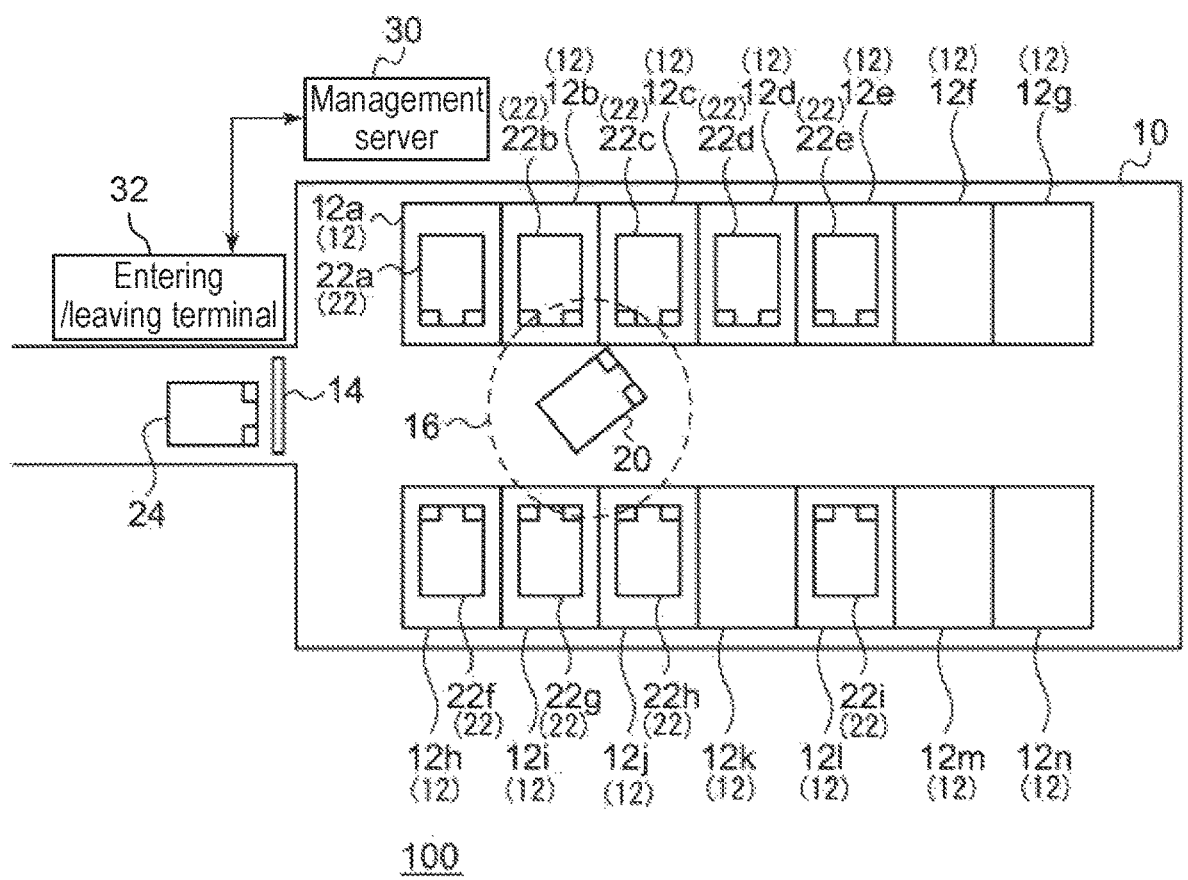
FIG. 1 is a diagram showing a configuration of a vehicle travel control system according to an exemplary embodiment.

FIG. 1 depicts a configuration of vehicle travel control system 100 according to the exemplary embodiment. Vehicle travel control system 100 includes management server 30 and entering/leaving terminal 32, and performs control over parking lot 10. Management server 30 and parking lot 10 may be physically separated from each other. Parking lot 10 includes 1st parking space 12a to 14th parking space 12n, which are collectively referred to as parking space 12, and entering/leaving gate 14. Parking lot 10 also includes disabled vehicle 20, 1st parked vehicle 22a to 9th parked vehicle 22i, which are collectively referred to as parked vehicle 22, and entering vehicle 24. Each of disabled vehicle 20, parked vehicle 22, and entering vehicle 24 is a vehicle that can be subjected to autonomous driving control and has the same configuration.

A vehicle parking procedure carried out by vehicle travel control system 100 will first be described. A vehicle stops at entering/leaving gate 14 before entering parking lot 10. This vehicle is indicated as entering vehicle 24. An occupant gets out of the vehicle having stopped at entering/leaving gate 14, thus leaving the vehicle empty. The occupant then operates entering/leaving terminal 32 installed near entering/leaving gate 14. Entering/leaving terminal 32 has an interface to which the occupant inputs information. The occupant operates the interface, and thereby inputs information on the vehicle to be parked, to the interface. To make description clear, it is assumed that identification information for identifying the vehicle and identification information used as an address checked by a radio communication function of the vehicle are a commonly used piece of information, which is called vehicle identifier (ID). In short, the occupant enters a vehicle ID in entering/leaving terminal 32. Subsequently, the occupant enters a parking start instruction in entering/leaving terminal 32.

Entering/leaving terminal 32 is connected to management server 30 via a network. Management server 30 manages a parking status in a plurality of parking spaces 12 in parking lot 10. For example, management server 30 manages a parking status in which a group of 1st parked vehicle 22a to 5th parked vehicle 22e, a group of 6th parked vehicle 22f to 8th parked vehicle 22h, and 9th parked vehicle 22i are arranged respectively in a group of 1st parking space 12a to 5th parking space 12e, a group of 8th parking space 12h to 10th parking space 12j, and 12th parking space 12l. Management server 30 also manages a parking status in which no parked vehicle 22 is placed in 6th parking space 12f, 7th parking space 12g, 11th parking space 12k, 13th parking space 12m, and 14th parking space 12n to leave these parking spaces empty.

When receiving the vehicle ID and the parking start instruction from entering/leaving terminal 32, management server 30 checks a parking status under its management and specifies one of empty parking spaces 12. Management server 30 generates route information indicating a route leading from entering/leaving gate 14 to specified empty parking space 12. The route information is expressed as, for example, a set of location coordinates arranged at given intervals on the route. Management server 30 has the radio communication function, and transmits the route information to a communication unit of the vehicle, using the radio communication function. The communication unit of the vehicle is configured to execute the radio communication function, and serves as, for example, a radio local area network (LAN). As described above, the address checked by the radio communication function of the vehicle is the vehicle ID. The address to which the route information is sent is, therefore, equivalent to the vehicle ID. In the following description, to make it clear, the communication unit is omitted from the description in which vehicle's transmitting/receiving a signal will be described.

The vehicle receives the route information from management server 30. As mentioned above, the vehicle has the autonomous driving control function. A publicly known technique may be used as the autonomous driving control function. Description of the autonomous driving control function will therefore be omitted. According to the route information the vehicle receives, the vehicle travels under autonomous driving control and executes parking in empty parking space 12. Management server 30 may transmit location information on empty parking space 12 to the vehicle to allow the vehicle to generate route information indicating a route leading from entering/leaving gate 14 to specified empty parking space 12. The vehicle parked in parking space 12 is equivalent to parked vehicle 22.

During execution of such a parking procedure, when the vehicle is traveling toward empty parking space 12 according to the route information or is traveling near empty parking space 12 to park therein, the vehicle may develop trouble and come to a stop in a passage in some cases. This stopped vehicle is equivalent to disabled vehicle 20. Disabled vehicle 20, which is incapable of moving due to its engine trouble, or the like, blocks a part of the passage. At this time, another incoming vehicle, that is, entering vehicle 24 may stop at entering/leaving gate 14. Entering vehicle 24, however, cannot pass through the passage blocked by disabled vehicle 20, and is therefore not allowed to park. In such a situation, vehicle travel control system 100 executes the following process to allow entering vehicle 24 to park in empty parking space 12.

Figure 2:
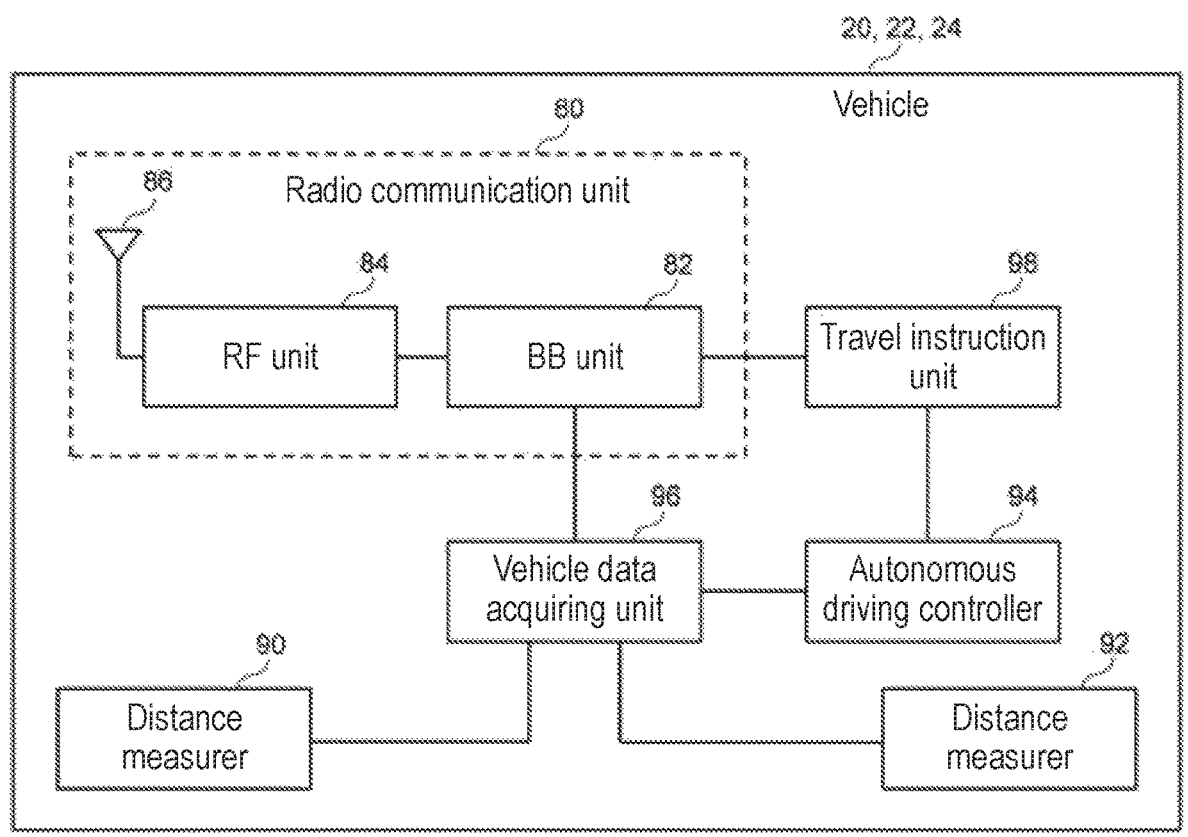
FIG. 2 is a diagram showing a configuration of disabled vehicle 20, parked vehicle 22, and entering vehicle 24 of FIG. 1.

FIG. 2 is a diagram showing a configuration of disabled vehicle 20, parked vehicle 22, and entering vehicle 24. As mentioned above, each of disabled vehicle 20, parked vehicle 22, and entering vehicle 24 is a vehicle that can be subjected to autonomous driving control and has the same configuration. Each of disabled vehicle 20, parked vehicle 22, and entering vehicle 24, that is, a vehicle includes radio communication unit 80, first distance measurer 90, second distance measurer 92, autonomous driving controller 94, vehicle data acquiring unit 96, and travel instruction unit 98. Each of disabled vehicle 20, parked vehicle 22, and entering vehicle 24, that is, the vehicle has a given width and a given length.

Radio communication unit 80 includes base band (BB) unit 82, radio frequency (RF) unit 84, and antenna 86. Radio communication unit 80, for example, performs radio communication with management server 30. In another configuration example, radio communication unit 80 may perform direct radio communication with a different vehicle (disabled vehicle 20, parked vehicle 22, or entering vehicle 24 that is different from the vehicle in which this radio communication unit 80 is included) without an intermediary process by management server 30. Base band unit 82 performs encoding and modulation of data to be transmitted, and thereby generates a transmission signal with a base band frequency. Base band unit 82 also performs demodulation and decoding of a reception signal with a base band frequency that is generated by radio frequency unit 84. Further, base band unit 82 performs signal processing related to radio communication. Radio frequency unit 84 converts a transmission signal with a base band frequency, the transmission signal being generated by base band unit 82, into a transmission signal with a radio frequency, and transmits the transmission signal wirelessly via antenna 86. Radio frequency unit 84 receives a reception signal with a radio frequency via antenna 86, converts the reception signal into a reception signal with a base band frequency, and outputs the reception signal to base band unit 82.

First distance measurer 90 measures a distance to an obstacle in a direction along a traveling direction of disabled vehicle 20, parked vehicle 22, or entering vehicle 24, that is, the vehicle. Second distance measurer 92 measures a distance to an obstacle in a direction opposite to the direction along the traveling direction of the vehicle. As first distance measurer 90 and second distance measurer 92, specifically, a millimeter-wave radar, a light detection and ranging or a laser imaging detection and ranging (LIDAR), a sonar, or the like can be used. The traveling direction of the vehicle is the direction in which the vehicle travels forward. The direction opposite to the traveling direction of the vehicle is the direction in which the vehicle travels backward.

Autonomous driving controller 94 is an autonomous driving controller having an autonomous driving control function. Autonomous driving controller 94 thus determines behavior of disabled vehicle 20, parked vehicle 22, or entering vehicle 24, that is, the vehicle under autonomous driving control. Specifically, autonomous driving controller 94 applies an incoming control command from travel instruction unit 98 or various pieces of information collected from various electronic control units (ECUs) to an autonomous driving algorithm, and thereby calculates a control value for controlling an autonomous control factor, such as an accelerator throttle opening rate and a steering angle of the vehicle (disabled vehicle 20, parked vehicle 22, or entering vehicle 24).

Vehicle data acquiring unit 96 acquires various pieces of information on disabled vehicle 20, parked vehicle 22, or entering vehicle 24, that is, the vehicle and transmits the acquired information to management server 30 via radio communication unit 80. Specifically, for example, vehicle data acquiring unit 96 acquires distances measured by first distance measurer 90 and second distance measurer 92 and transmits the distances to management server 30. For example, vehicle data acquiring unit 96 also acquires various pieces of information from various ECUs, the information being collected by autonomous driving controller 94, and transmits the acquired information to management server 30. Further, vehicle data acquiring unit 96 acquires information indicating whether the vehicle (disabled vehicle 20, parked vehicle 22, or entering vehicle 24) is in a normal state, that is, whether the vehicle has developed trouble, the information being acquired from autonomous driving controller 94, and transmits the information to management server 30.

In a case where management server 30 does not perform control and one of disabled vehicle 20, parked vehicle 22, and entering vehicle 24 performs the same control as management server 30 does, vehicle data acquiring unit 96 transmits various pieces of information directly to a different vehicle via radio communication unit 80 without an intermediary process by management server 30.

When management server 30 performs the control, travel instruction unit 98 receives a control command for autonomous driving control over the vehicle (disabled vehicle 20, parked vehicle 22, or entering vehicle 24) from management server 30, via radio communication unit 80. Travel instruction unit 98 inputs the received control command, to autonomous driving controller 94.

When management server 30 does not perform the control, travel instruction unit 98 directly acquires various pieces of information on a different vehicle via radio communication unit 80 without an intermediary process by management server 30. In this case, to perform control by vehicle travel control system 100, which will be described later, travel instruction unit 98 transmits the control command not only to autonomous driving controller 94 of the vehicle in which travel instruction unit 98 is included but also directly to autonomous driving controller 94 of a different vehicle, via radio communication unit 80 without an intermediary process by management server 30. When receiving the control command via radio communication unit 80, autonomous driving controller 94 of the different vehicle processes the control command as an input command to autonomous driving controller 94.

In the above description, vehicle data acquiring unit 96 and travel instruction unit 98 are described as discrete component units. However, vehicle data acquiring unit 96 and travel instruction unit 98 may be provided as component units serving as a part of radio communication unit 80, or base band unit 82 of radio communication unit 80.

Figure 3:
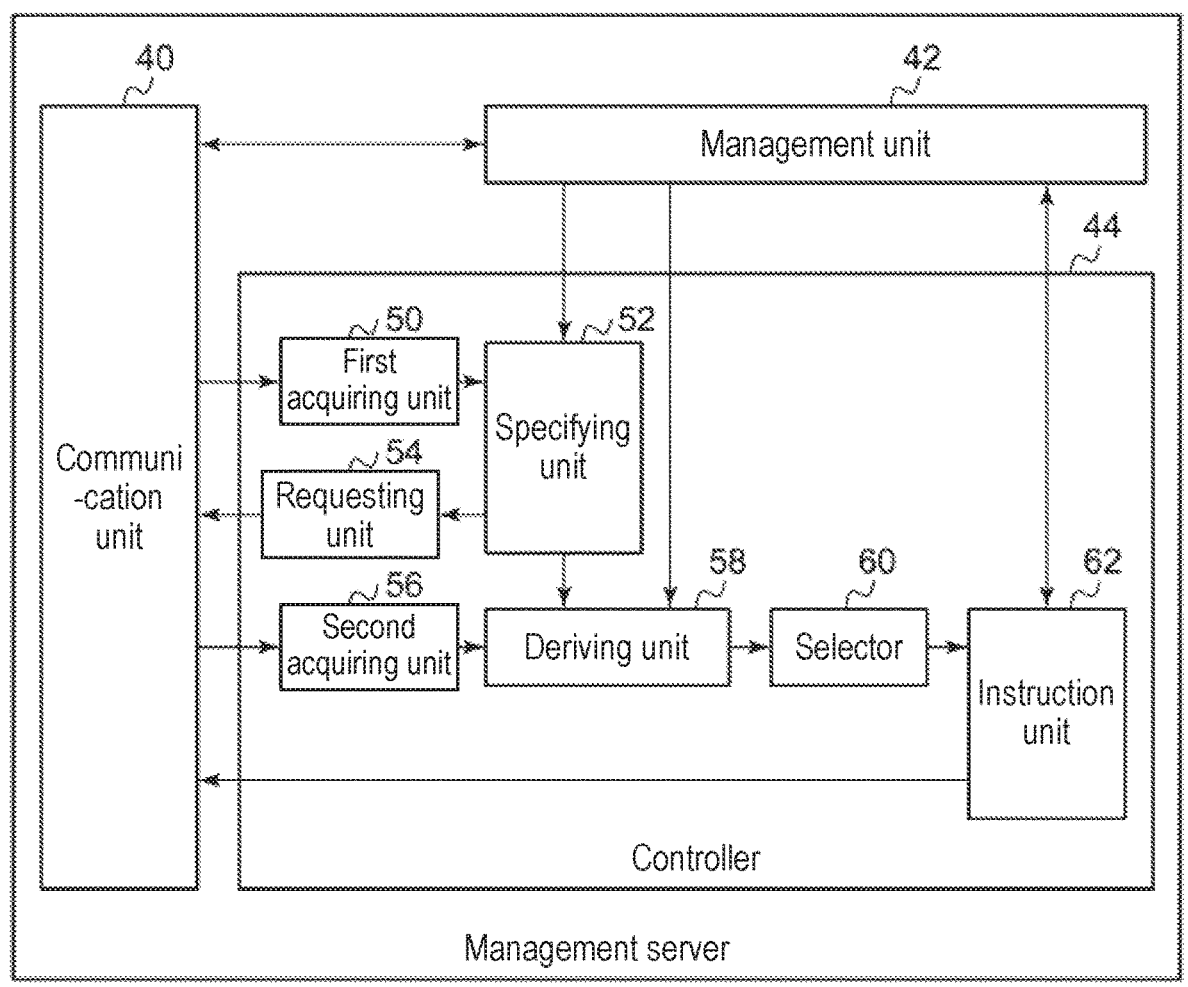
FIG. 3 is a diagram showing a configuration of management server 30 of FIG. 1.

FIG. 3 depicts a configuration of management server 30. Management server 30 includes communication unit 40, management unit 42, and controller 44. Controller 44 includes first acquiring unit 50, specifying unit 52, requesting unit 54, second acquiring unit 56, deriving unit 58, selector 60, and instruction unit 62. Communication unit 40 communicates with entering/leaving terminal 32 of FIG. 1 and with each vehicle. As described above, each vehicle has the radio communication function. Communication unit 40, therefore, has the radio communication function corresponding to the radio communication function of each vehicle. Communication unit 40 communicates with entering/leaving terminal 32 by either radio communication or wired communication. A publicly known technique may be applied to communication unit 40.

Management unit 42 is connected to communication unit 40, and, as described above, manages a parking status in parking spaces 12 in parking lot 10. When receiving a vehicle ID and a parking start instruction via communication unit 40, management unit 42 specifies one empty parking space 12 based on the parking status and generates route information for parking the vehicle in specified empty parking space 12. Management unit 42 outputs the vehicle ID and route information to communication unit 40, which then transmits the received route information to an address indicated as the vehicle ID. Because the vehicle is parked in specified empty parking space 12, management unit 42 stores combined information of parking space 12 and the vehicle ID. Hence empty parking space 12 is changed to occupied parking space 12. Management unit 42 carries out the above described process. A process carried out in a case where disabled vehicle 20 stalls in the passage in parking lot 10, the case being shown in FIG. 1, will hereinafter be described.

First acquiring unit 50 acquires location information from disabled vehicle 20 via communication unit 40. Disabled vehicle 20 has a location acquiring function corresponding to that of a global navigation satellite system (GNSS) or the like, and transmits location information acquired by the location acquiring function, the location information being included in a trouble notification signal, to management server 30. First acquiring unit 50 outputs the location information on disabled vehicle 20 to specifying unit 52.

Based on the location information on disabled vehicle 20, specifying unit 52 refers to management unit 42, and thereby specifies a plurality of parked vehicles 22 parked near disabled vehicle 20. For example, as demonstrated by FIG. 1, specifying unit 52 sets subject circle 16 having a given radius from a central point corresponding to a location indicated by the location information on disabled vehicle 20. The given radius is specified as a maximum vehicle width of vehicles to be parked in parking lot 10. Based on a parking status managed by management unit 42, specifying unit 52 specifies parked vehicles 22 included in subject circle 16, as parked vehicles 22 parked near disabled vehicle 20. In this case, 2nd parked vehicle 22*b*, 3rd parked vehicle 22*c*, 7th parked vehicle 22*g*, and 8th parked vehicle 22*h* are specified as parked vehicles 22. Now FIG. 3 is referred to again. Specifying unit 52 notifies requesting unit 54 of vehicle IDs for specified parked vehicles 22.

Requesting unit 54 generates a request signal for requesting each of parked vehicles 22 specified by specifying unit 52 to report a first distance and a second distance. The first distance is a distance between parked vehicle 22 and disabled vehicle 20, and the second distance is a distance that parked vehicle 22 can travel in a direction of moving away from disabled vehicle 20. An address to which each request signal is transmitted is a vehicle ID for parked vehicle 22 specified by specifying unit 52. Requesting unit 54 outputs the request signal to communication unit 40. Communication unit 40 transmits the request signal to each parked vehicle 22. Parked vehicle 22 has its radio communication function working even in a parked state.

Figure 4:
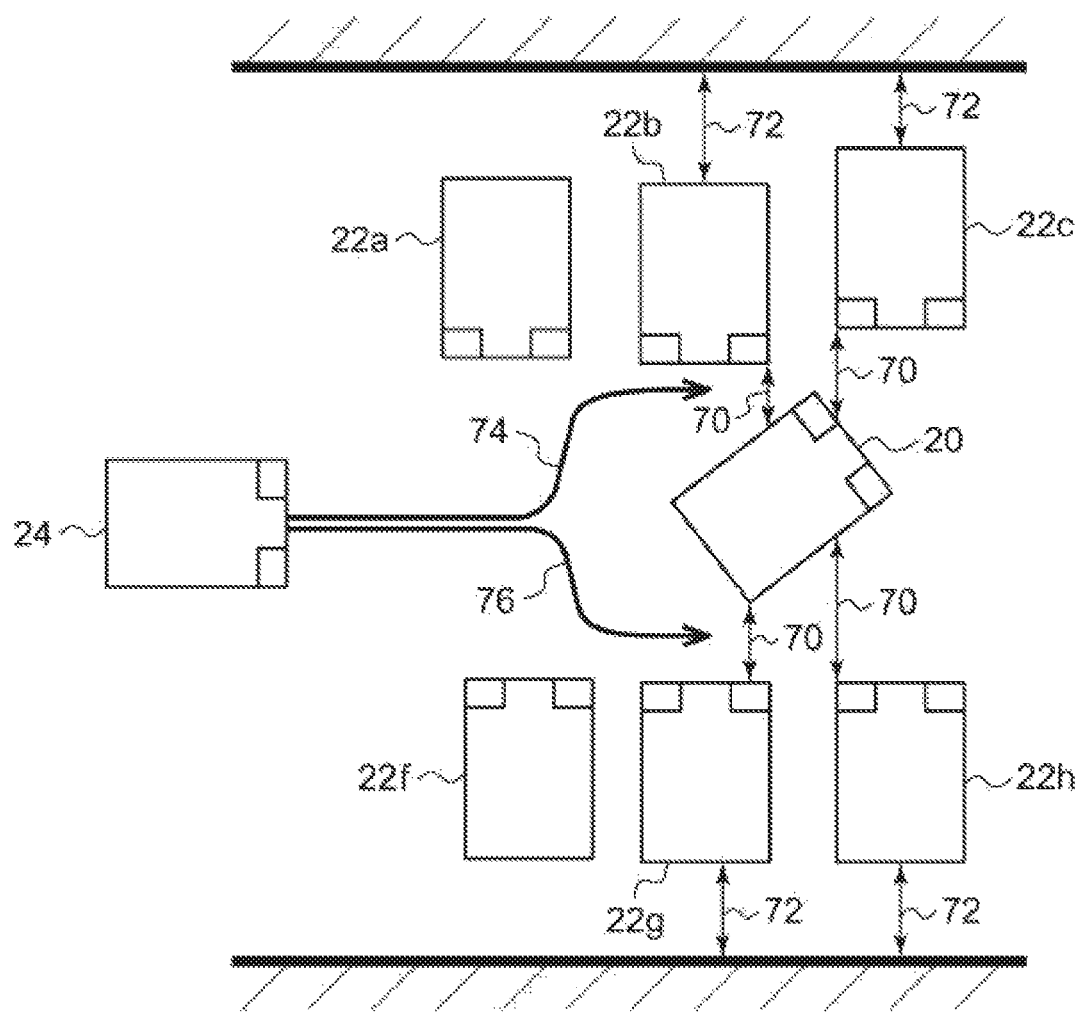
FIG. 4 depicts an outline of a process carried out by a controller of FIG. 2.

Second acquiring unit 56 acquires the first distance and the second distance from each parked vehicle 22, as a response to the request signal, via communication unit 40. FIG. 4 depicts an outline of a process carried out by controller 44. FIG. 4 is an enlarged view of the vicinity of disabled vehicle 20 of FIG. 1. For clearer depiction, frames of parking spaces 12 are omitted. Parked vehicles 22, to each of which the request signal is transmitted, are 2nd parked vehicle 22*b*, 3rd parked vehicle 22*c*, 7th parked vehicle 22*g*, and 8th parked vehicle 22*h*. 2nd parked vehicle 22*b*, 3rd parked vehicle 22*c*, 7th parked vehicle 22*g*, and 8th parked vehicle 22*h* have their respective front sides facing disabled vehicle 20. 2nd parked vehicle 22*b* equipped with a sensor, sonar, and the like keeps such equipment working even in a parked state, and thereby measures first distance 70 and second distance 72. Second distance 72 is equivalent to a distance that 2nd parked vehicle 22*b* can travel backward from its current location. In the same manner, each of 3rd parked vehicle 22*c*, 7th parked vehicle 22*g*, and 8th parked vehicle 22*h* measures first distance 70 and second distance 72. FIG. 3 is referred to again. Second acquiring unit 56 outputs first distance 70 and second distance 72 of each parked vehicle 22, to deriving unit 58.

Deriving unit 58 receives first distance 70 and second distance 72 of each parked vehicle 22, first distance 70 and second distance 72 being transmitted from second acquiring unit 56. Deriving unit 58 forms two routes between parked vehicles 22, of which first distances 70 and second distances 72 are acquired by second acquiring unit 56, and disabled vehicle 20. These two routes are formed in such a way as to branch into different directions to detour disabled vehicle 20. FIG. 4 shows first route 74 formed in such a way as to pass through the left side of disabled vehicle 20 and second route 76 formed in such a way as to pass through the right side of disabled vehicle 20. A parking status managed by management unit 42 may be utilized to form first route 74 and second route 76.

2nd parked vehicle 22*b* and 3rd parked vehicle 22*c* are parked on first route 74 side and first route 74 is formed between these parked vehicles 22*b*, 22*c* and disabled vehicle 20. For first route 74, deriving unit 58 derives a third distance of 2nd parked vehicle 22*b* by adding up first distance 70 and second distance 72 and also derives a third distance of 3rd parked vehicle 22*c* by adding up first distance 70 and second distance 72. Deriving unit 58 then derives smaller one of the third distance of 2nd parked vehicle 22*b* and the third distance of 3rd parked vehicle 22*c*, as a route width of first route 74.

7th parked vehicle 22*g* and 8th parked vehicle 22*h* are parked on second route 76 side and second route 76 is formed between these parked vehicles 22*g*, 22*h* and disabled vehicle 20. For second route 76, deriving unit 58 derives a third distance of 7th parked vehicle 22*g* by adding up first distance 70 and second distance 72 and also derives a third distance of 8th parked vehicle 22*h* by adding up first distance 70 and second distance 72. Deriving unit 58 then derives smaller one of the third distance of 7th parked vehicle 22*g* and the third distance of 8th parked vehicle 22*h*, as a route width of second route 76. Deriving unit 58 outputs the route width of first route 74 and the route width of second route 76, to selector 60.

Based on the route widths derived by deriving unit 58, selector 60 selects one of first route 74 and second route 76. When the route width of first route 74 is larger than that of second route 76, selector 60 selects first route 74. When the route width of first route 74 is smaller than that of second route 76, selector 60 selects second route 76. When the route width of first route 74 is equal to that of second route 76, selector 60 selects one of these routes that includes fewer parked vehicles 22. When the route width of first route 74 is equal to that of second route 76 and both routes include the same number of parked vehicles 22, selector 60 selects one of these routes in which a total of second distances 72 is smaller than that in the other route. Selector 60 notifies instruction unit 62 of a selected route and its route width.

Instruction unit 62 compares the route width of one route selected by selector 60 with the vehicle width of a vehicle scheduled to pass through the route. The vehicle width of the vehicle scheduled to pass through the route is obtained in such a way that an image of entering vehicle 24, the image being taken by a camera set near entering/leaving gate 14 of FIG. 1, is sent to management server 30, where the image is analyzed by instruction unit 62 to identify the vehicle width. This vehicle width may be specified as the maximum vehicle width of vehicles to be parked in parking lot 10, as the radius of subject circle 16 is. When the route width is larger than the vehicle width, instruction unit 62 generates an instruction signal for instructing parked vehicle 22 parked on the route to travel in a direction of moving away from disabled vehicle 20. For example, when second route 76 of FIG. 4 is selected, the instruction signal instructs 7th parked vehicle 22*g* and 8th parked vehicle 22*h* to travel backward. A travel distance in this case is, for example, equivalent to second distance 72 of each parked vehicle 22. When the route width becomes larger than the vehicle width even if parked vehicle 22 does not travel second distance 72 completely, instruction unit 62 may specify a travel distance smaller than second distance 72, the travel distance making the route width larger than the vehicle width, as a distance to travel indicated by the instruction signal. Instruction unit 62 transmits the instruction signal to parked vehicle 22 parked on the route, via communication unit 40.

Figure 5:
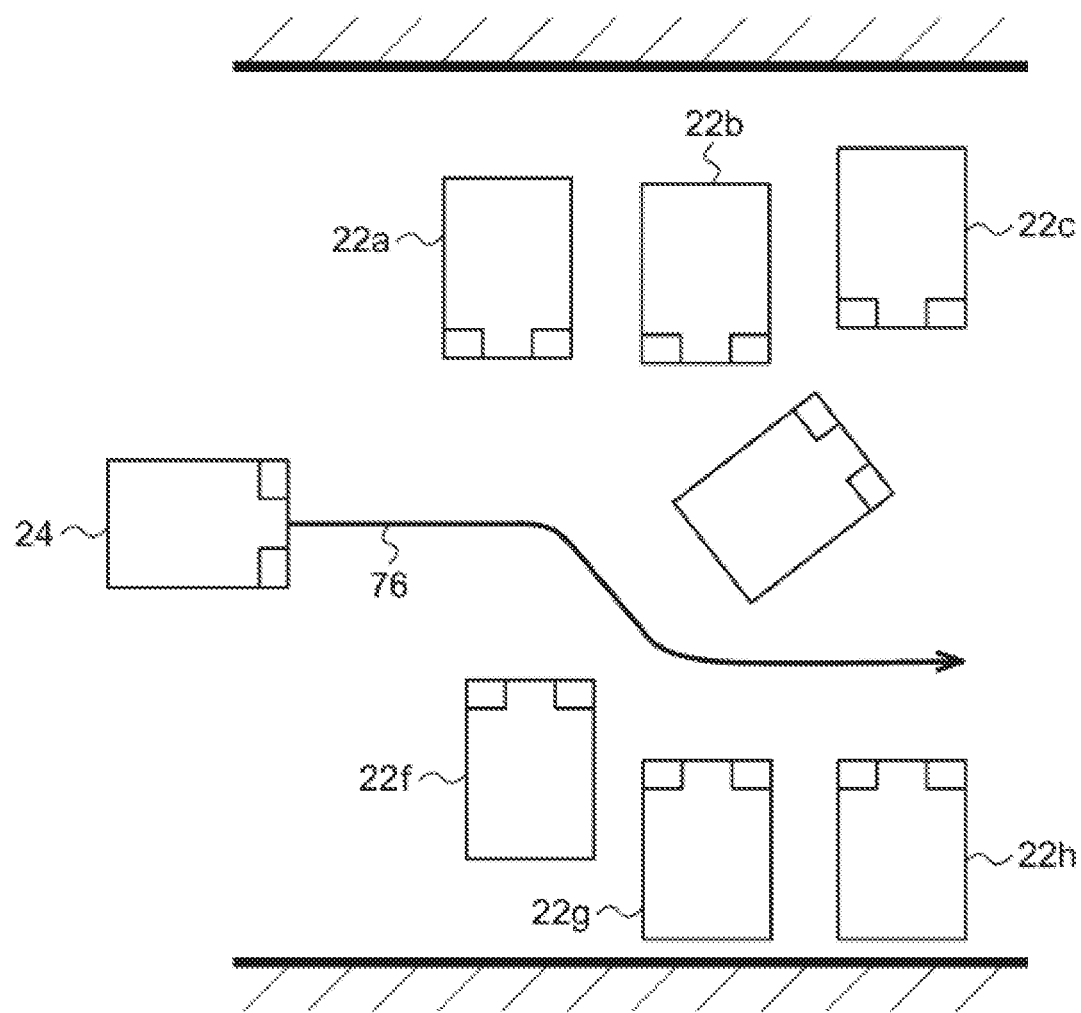
FIG. 5 depicts a route that is selected after an instruction is given by the controller of FIG. 2.

When receiving the instruction signal from management server 30, parked vehicle 22, despite being in the parked state, executes autonomous driving control, and thereby travels the distance indicated in the instruction signal in a specified direction. For example, 7th parked vehicle 22*g* and 8th parked vehicle 22*h* shown in FIG. 4 travel backward second distance 72 of 7th parked vehicle 22*g* and that of 8th parked vehicle 22*h*, respectively. FIG. 5 depicts a route that is selected after an instruction is given by controller 44. In FIG. 5, which shows vehicle arrangement similar to that of FIG. 4, second route 76, through which entering vehicle 24 is allowed to travel, is formed as a result of 7th parked vehicle 22*g* and 8th parked vehicle 22*h* having traveled backward. Having traveled through second route 76, entering vehicle 24 can park in 6th parking space 12*f* of FIG. 1.

When the route width is equal to or smaller than the vehicle width, on the other hand, instruction unit 62 generates an instruction signal for instructing parked vehicle 22 parked on the route to move to empty parking space 12. In this case, instruction unit 62 refers to management unit 42 to check a parking status and specifies empty parking space 12. In the same manner as generation of route information by management unit 42, instruction unit 62 generates route information indicating a route leading from current parking space 12, which is adjacent to the route, to specified empty parking space 12. Instruction unit 62 transmits the instruction signal to parked vehicle 22 parked on the route, via communication unit 40.

When receiving the instruction signal from management server 30, parked vehicle 22, despite being in the parked state, executes autonomous driving control to move along the route indicated by the route information included in the instruction signal, and thereby travels to newly specified empty parking space 12 to park there. For example, 7th parked vehicle 22*g* and 8th parked vehicle 22*h* move out of 9th parking space 12*i* and 10th parking space 12*j* shown in FIG. 1 and travel along second route 76 to 13th parking space 12*m* and 14th parking space 12*n*, respectively, to park there. As a result, the route width of second route 76 is increased to make second route 76 wide enough to allow entering vehicle 24 to travel therethrough.

Figure 6:
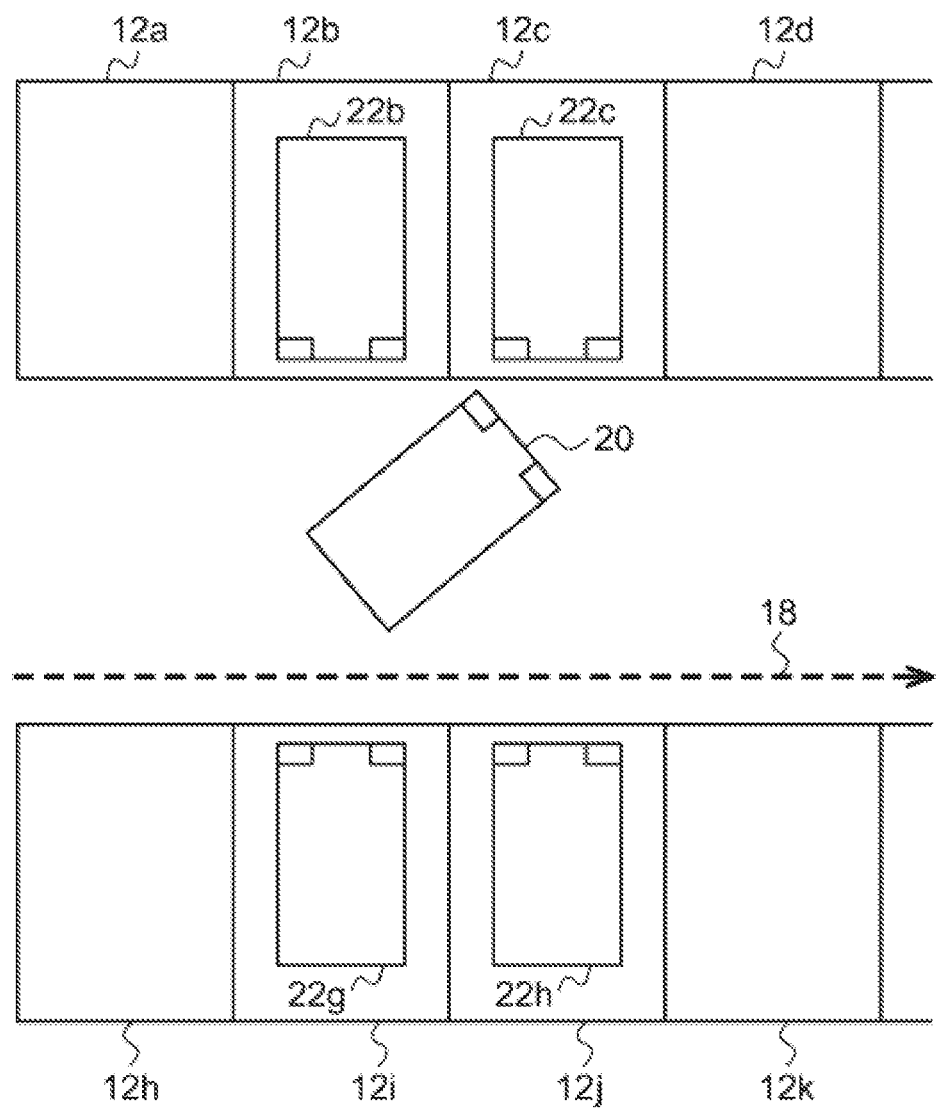
FIG. 6 depicts an outline of a process carried out by an instruction unit of FIG. 2.

A process by which parked vehicle 22 is caused to move to empty parking space 12 will be described with reference to FIG. 6. FIG. 6 depicts an outline of a process carried out by instruction unit 62. In FIG. 6, disabled vehicle 20, 2nd parked vehicle 22*b*, 3rd parked vehicle 22*c*, 7th parked vehicle 22*g*, and 8th parked vehicle 22*h* are depicted in the same manner as in FIG. 1. A direction in which entering vehicle 24 travels is indicated as travel direction 18. It is assumed that two parked vehicles 22 are caused to move to empty parking spaces. When moving parked vehicles 22 to empty parking spaces 12 is decided, instruction unit 62 specifies empty parking spaces 12, as described above.

In a case where, along travel direction 18, empty parking space 12 is present in both a location before passing through disabled vehicle 20 and a location after passing through disabled vehicle 20, instruction unit 62 causes parked vehicles 22 to move in order of parked vehicle 22 more distant from disabled vehicle 20 moving first. The case where empty parking space 12 is present in both the location before passing through disabled vehicle 20 and the location after passing through disabled vehicle 20 means that at least either 1st parking space 12*a* or 8th parking space 12*h* is empty and at least either 4th parking space 12*d* or 11th parking space 12*k* is empty.

Instruction unit 62 generates route information for causing one parked vehicle 22 whose distance to disabled vehicle 20, that is, first distance 70 is larger to move to empty parking space 12, and transmits an instruction signal including the route information to one parked vehicle 22. One parked vehicle 22 moves according to the route information included in the received instruction signal, thus traveling to newly specified empty parking space 12 to park there. Subsequently, instruction unit 62 generates route information for causing the other parked vehicle 22 to move to empty parking space 12, and transmits an instruction signal including the route information to the other parked vehicle 22, via communication unit 40. The other parked vehicle 22 moves according to the route information included in the received instruction signal, thus traveling to newly specified empty parking space 12 to park there.

In a case where, along travel direction 18, empty parking space 12 is present only in either a location before passing through disabled vehicle 20 or a location after passing through disabled vehicle 20, instruction unit 62 causes parked vehicles 22 to move in order of parked vehicle 22 closer to empty parking space 12 moving first. The case where empty parking space 12 is present only in either the location before passing through disabled vehicle 20 or the location after passing through disabled vehicle 20 means either one of that 1st parking space 12*a* and 8th parking space 12*h* are both empty or that 4th parking space 12*d* and 11th parking space 12*k* are both empty.

Instruction unit 62 generates route information for causing one parked vehicle 22 closer to empty parking space 12 to move to empty parking space 12, and transmits an instruction signal including the route information to one parked vehicle 22, via communication unit 40. One parked vehicle 22 moves according to the route information included in the received instruction signal, thus traveling to newly specified empty parking space 12 to park there. Subsequently, instruction unit 62 generates route information for causing the other parked vehicle 22 to move to empty parking space 12, and transmits an instruction signal including the route information to the other parked vehicle 22, via communication unit 40. The other parked vehicle 22 moves according to the route information included in the received instruction signal, thus traveling to newly specified empty parking space 12 to park there. Parked vehicles 22 are caused to move in the above manner because that causing one parked vehicle 22 more distant from empty parking space 12 to move first results in the smaller width of the route through which the other parked vehicle 22 travels, creating a possibility that the other parked vehicle 22 cannot travel through the route.

This configuration can be achieved through a central processing unit (CPU), a memory, and other large scale integration (LSI) of any given computer in terms of hardware and through a program or the like loaded onto a memory in terms of software. The drawings provided herein depict functional blocks achieved through coordination of such constituent elements. It will be understood, therefore, by those who are skilled in the art that these functional blocks can be achieved in various forms by hardware only or by combinations of hardware and software. For example, these functional blocks can be implemented in the form of a physical circuit, such as a dedicated integrated circuit (IC) and an LSI.

Figure 7:
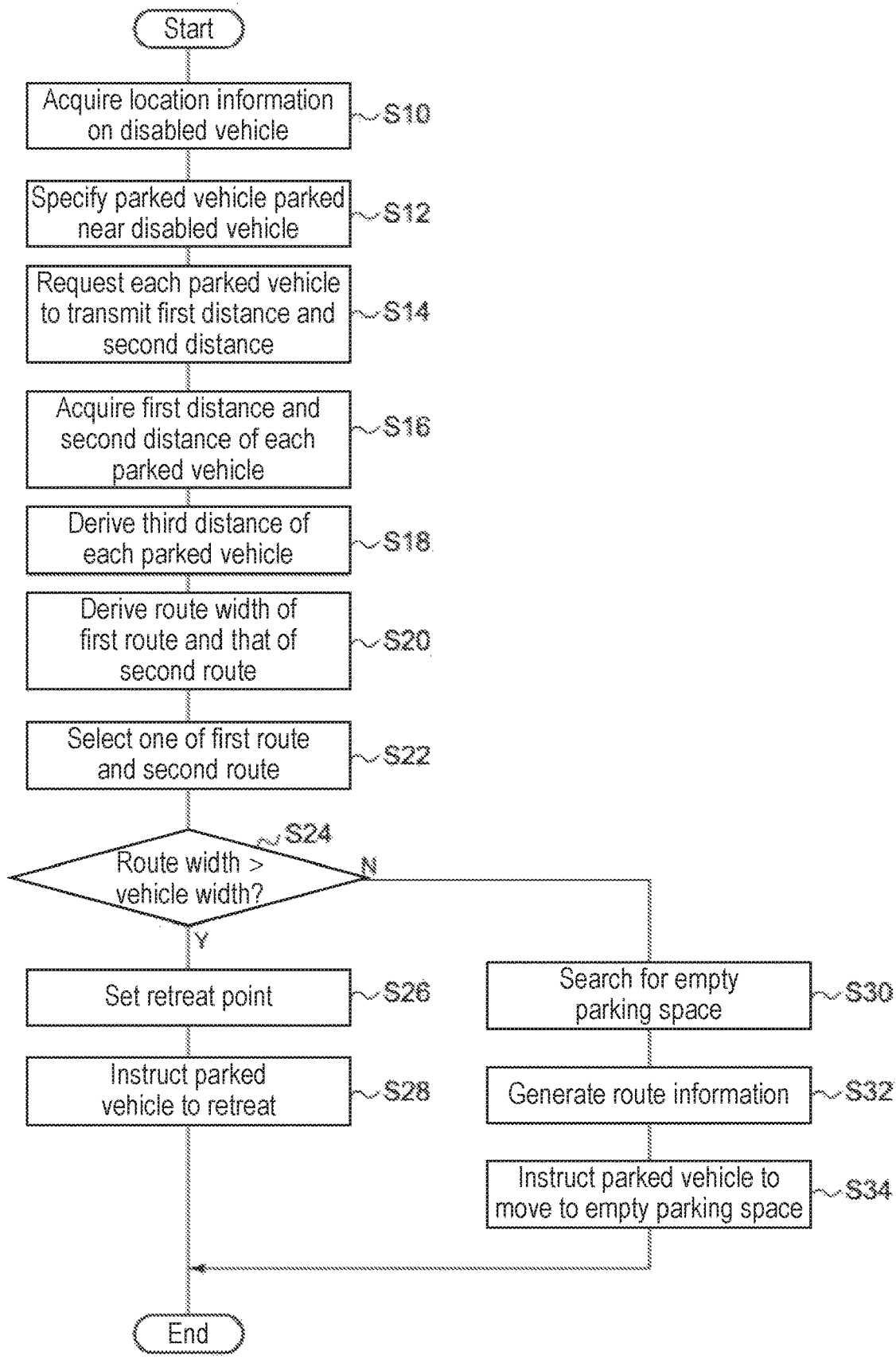
FIG. 7 is a flowchart showing a control procedure carried out by the vehicle travel control system of FIG. 1.

An operation of vehicle travel control system 100 having the above configuration will be described. FIG. 7 is a flowchart showing a control procedure carried out by vehicle travel control system 100. First acquiring unit 50 acquires location information on disabled vehicle 20 (S10). Specifying unit 52 specifies parked vehicles 22 parked near disabled vehicle 20 (S12). Requesting unit 54 requests each parked vehicle 22 to transmit first distance 70 and second distance 72 (S14). Second acquiring unit 56 acquires first distance 70 and second distance 72 of each parked vehicle 22 (S16). Deriving unit 58 derives third distance of each parked vehicle 22 (S18), and derives respective route widths of first route 74 and second route 76 (S20). Selector 60 selects one of first route 74 and second route 76 (S22). When a relation of the route width>the vehicle width is satisfied (Y at S24), instruction unit 62 sets a retreat point (S26) and instructs parked vehicle 22 to retreat (S28). When a relation of the route width>the vehicle width is not satisfied (N at S24), on the other hand, instruction unit 62 searches for empty parking space 12 (S30) and generates route information (S32). Instruction unit 62 instructs parked vehicle 22 to move to empty parking space 12 (S34).

Figure 8:
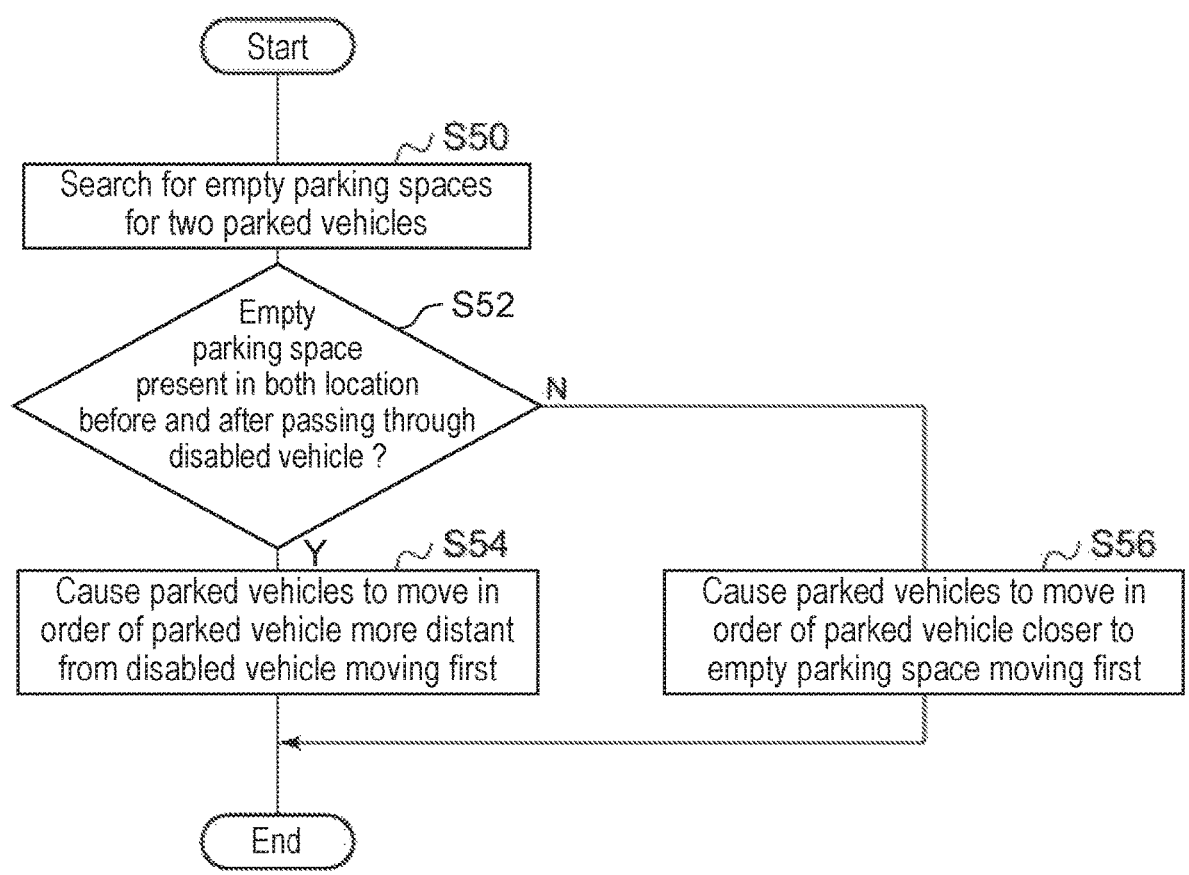
FIG. 8 is a flowchart showing a travel route generating procedure carried out by the vehicle travel control system of FIG. 1.

FIG. 8 is a flowchart showing a travel route generating procedure carried out by vehicle travel control system 100. Instruction unit 62 searches for empty parking spaces 12 for two parked vehicles 22 (S50). When empty parking space 12 is present in both a location before passing through disabled vehicle 20 and a location after passing through disabled vehicle 20 (Y at S52), instruction unit 62 causes parked vehicles 22 to move in order of parked vehicle 22 more distant from disabled vehicle 20 moving first (S54). When empty parking space 12 is present only in either of a location before passing through disabled vehicle 20 or a location after passing through disabled vehicle 20 (N at S52), instruction unit 62 causes parked vehicles 22 to move in order of parked vehicle 22 closer to empty parking space 12 moving first (S56).

The control procedures of FIGS. 7 and 8 have been described mainly as a case where management server 30 communicates wirelessly with vehicles (disabled vehicle 20, parked vehicle 22, and entering vehicle 24) to perform control. However, each vehicle (disabled vehicle 20, parked vehicle 22, or entering vehicle 24) may wirelessly communicate directly with a different vehicle (disabled vehicle 20, parked vehicle 22, or entering vehicle 24 that is different from the above vehicle) without an intermediary process by management server 30 to perform the same control.

Figure 9:
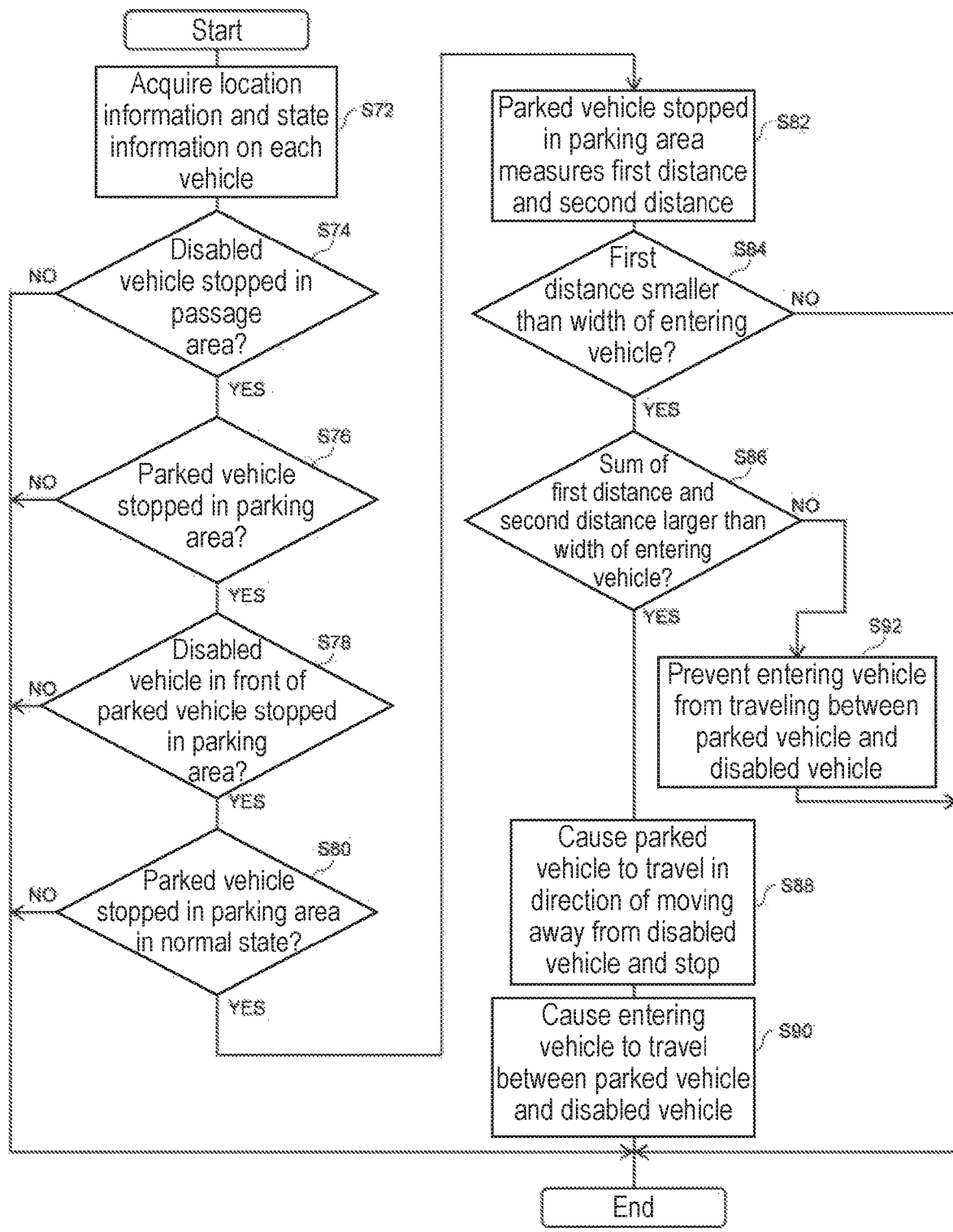
FIG. 9 is a flowchart showing another control procedure carried out by the vehicle travel control system of FIG. 1.

FIG. 9 is a flowchart showing another control procedure carried out by vehicle travel control system 100. The control procedure of FIG. 9 will be described mainly as a case where each vehicle (disabled vehicle 20, parked vehicle 22, or entering vehicle 24) wirelessly communicates directly with a different vehicle (disabled vehicle 20, parked vehicle 22, or entering vehicle 24 that is different from the above vehicle) without an intermediary process by management server 30 to perform control. A case where entering vehicle 24 wirelessly communicates directly with disabled vehicle 20 and with parked vehicle 22 without an intermediary process by management server 30 to perform control will be described as a specific example.

The control procedure of FIG. 9 starts, for example, at a point at which entering vehicle 24 stops at entering/leaving gate 14. At the point at which entering vehicle 24 stops at entering/leaving gate 14, entering vehicle 24 does not know whether disabled vehicle 20 or parked vehicle 22 is parked in parking lot 10 and does not know either whether each vehicle parked in parking lot 10 is disabled vehicle 20 or parked vehicle 22.

Travel instruction unit 98 of entering vehicle 24 first requests the vehicle in parking lot 10 to transmit location information and state information on the vehicle via radio communication unit 80 and receives the location information and state information from the vehicle in parking lot 10 via radio communication unit 80 (S72). The state information includes at least either information indicative of the vehicle being in a normal state or information indicative of the vehicle being in a disabled state. The state information also includes at least either information indicative of the vehicle being traveling or information indicative of the vehicle being stopped.

Travel instruction unit 98 of entering vehicle 24 then determines whether disabled vehicle 20 is stopped in a passage area in parking lot 10 (S74). Travel instruction unit 98 can determine that the vehicle is disabled vehicle 20, by confirming that information indicative of the vehicle being in the disabled state is included in the state information received from the vehicle in parking lot 10 or that information indicative of the vehicle being in the normal state is not included in the state information received from the vehicle in parking lot 10. Travel instruction unit 98 can determine that the vehicle is stopped, by confirming that information indicative of the vehicle being stopped is included in the state information received from the vehicle in parking lot 10 or that information indicative of the vehicle being traveling is not included in the state information received from the vehicle in parking lot 10. The passage area is an area demarcated between parking spaces 12 on one side and parking spaces 12 on the other side in parking lot 10 or an area in parking lot 10 that is not allocated as parking spaces 12. For example, in the case of parking lot 10 of FIG. 1, the passage area is demarcated between an area made up of 1st parking space 12a to 7th parking space 12g and an area made up of 8th parking space 12h to 14th parking space 12n. Travel instruction unit 98 can determine an area to be the passage area based on location information on the vehicle, the location information being received from the vehicle in parking lot 10. When disabled vehicle 20 is stopped in the passage area in parking lot 10 (YES at S74), a process of step S76 is carried out. When disabled vehicle 20 is not stopped in the passage area in parking lot 10 (NO at S74), the control procedure is ended.

At step S76, travel instruction unit 98 of entering vehicle 24 determines whether parked vehicle 22 is stopped in a parking area. The parking area is an area of parking spaces 12 in parking lot 10. Travel instruction unit 98 can determine an area to be the parking area based on location information on the vehicle, the location information being received from the vehicle in parking lot 10. Travel instruction unit 98 can determine that the vehicle is stopped, by confirming that information indicative of the vehicle being stopped is included in the state information received from the vehicle in parking lot 10 or that information indicative of the vehicle being traveling is not included in the state information received from the vehicle in parking lot 10. Travel instruction unit 98 thus can determine that the vehicle stopped in the parking area is parked vehicle 22. When parked vehicle 22 is stopped in the parking area (YES at S76), a process of step S78 is carried out. When parked vehicle 22 is not stopped in the parking area (NO at S76), the control procedure is ended.

At step S78, travel instruction unit 98 of entering vehicle 24 determines whether disabled vehicle 20 is in front of parked vehicle 22 stopped in the parking area. In other words, travel instruction unit 98 determines whether disabled vehicle 20 is stopped in the passage area adjacent to the parking area, the passage area being on a path in which parked vehicle 22 travels. Travel instruction unit 98 can make this determination based on location information on parked vehicle 22, the location information being received from parked vehicle 22 in parking lot 10, and on location information on disabled vehicle 20, the location information being received from disabled vehicle 20 in parking lot 10. When disabled vehicle 20 is in front of parked vehicle 22 stopped in the parking area (YES at S78), a process of step S80 is carried out. When disabled vehicle 20 is not in front of parked vehicle 22 stopped in the parking area (NO at S78), the control procedure is ended.

At step S80, travel instruction unit 98 of entering vehicle 24 determines whether parked vehicle 22 stopped in the parking area is in the normal state. Travel instruction unit 98 can determine that parked vehicle 22 is in the normal state, by confirming that information indicative of the vehicle being in the disabled state is not included in the state information received from parked vehicle 22 in parking lot 10 or that information indicative of the vehicle being in the normal state is included in the state information received from parked vehicle 22 in parking lot 10. When parked vehicle 22 stopped in the parking area is in the normal state (YES at S80), a process of step S82 is carried out. When parked vehicle 22 stopped in the parking area is not in the normal state (NO at S80), the control procedure is ended.

At step S82, travel instruction unit 98 of entering vehicle 24 sends a request for measuring the first distance and the second distance to parked vehicle 22 stopped in the parking area, via radio communication unit 80. The first distance is a distance from parked vehicle 22 to an obstacle in front of parked vehicle 22. The second distance is a distance from parked vehicle 22 to an obstacle at the rear of parked vehicle 22. When receiving the above request, parked vehicle 22 transmits information of the first distance measured by first distance measurer 90 and information of the second distance measured by second distance measurer 92 to entering vehicle 24, via radio communication unit 80. Entering vehicle 24 then receives the information of the first distance and the second distance of parked vehicle 22 stopped in the parking area (S82).

Subsequently, travel instruction unit 98 of entering vehicle 24 determines whether the first distance is smaller than the width of entering vehicle 24 (S84). When the first distance is smaller than the width of entering vehicle 24 (YES at S84), a process of step S86 is carried out. When the first distance is not smaller than the width of entering vehicle 24 (NO at S84), the control procedure is ended.

At step S86, travel instruction unit 98 of entering vehicle 24 determines whether the sum of the first distance and the second distance is larger than the width of entering vehicle 24 (S86). When the sum of the first distance and the second distance is larger than the width of entering vehicle 24 (YES at S86), a process of step S88 is carried out. When the sum of the first distance and the second distance is not larger than the width of entering vehicle 24 (NO at S86), a process of step S92 is carried out.

At step S88, travel instruction unit 98 of entering vehicle 24 sends a request to parked vehicle 22 stopped in the parking area for its traveling in a direction of moving away from disabled vehicle 20, via radio communication unit 80. When receiving this request, parked vehicle 22 travels in the direction of moving away from disabled vehicle 20. After traveling, parked vehicle 22 stops in such a way as not to collide against an obstacle.

Subsequently, travel instruction unit 98 of entering vehicle 24 instructs autonomous driving controller 94 of entering vehicle 24 to perform driving control to cause entering vehicle 24 to travel between parked vehicle 22 stopped in the parking area and disabled vehicle 20. Thus, under control by autonomous driving controller 94, entering vehicle 24 travels between parked vehicle 22 stopped in the parking area and disabled vehicle 20 (S90), after which the control procedure ends.

At step S92, in contrast, entering vehicle 24 does not travel between parked vehicle 22 stopped in the parking area and disabled vehicle 20. In other words, entering vehicle 24 changes its route so as not to travel between parked vehicle 22 stopped in the parking area and disabled vehicle 20. For example, entering vehicle 24 changes its route to park in parking space 12 different from parking space 12 in which entering vehicle 24 is originally scheduled to park.

The control procedure of FIG. 9 has been described as a specific example in which entering vehicle 24 wirelessly communicates directly with disabled vehicle 20 and with parked vehicle 22 without an intermediary process by management server 30 to perform control. However, management server 30 may wirelessly communicate with vehicles (disabled vehicle 20, parked vehicle 22, and entering vehicle 24) to perform the same control. In another case, disabled vehicle 20 or parked vehicle 22 may wirelessly communicates directly with a different vehicle without an intermediary process by management server 30 to perform the same control.

According to the exemplary embodiment of the present disclosure, the parked vehicle is caused to move to form the route between the disabled vehicle and the plurality of parked vehicles parked near the disabled vehicle. The entering vehicle is therefore allowed to travel through the route. Because the entering vehicle travels through the route, even if the disabled vehicle cannot move, its influence on traveling of a different vehicle is reduced. The first distance and the second distance are acquired from each of the parked vehicles parked near the disabled vehicle. As a result, the third distance of each parked vehicle can be derived. The route width of the route is derived based on the third distance. Because of this process, whether route formation is effective can be determined before the parked vehicle is caused to move.

Because the minimum third distance is derived as the route width of the route, whether the vehicle can travel through the route can be determined. When the route width is equal to or smaller than the vehicle width, the parked vehicle is instructed to move into an empty parking space. This makes the route width larger than the vehicle width. The route width made larger than the vehicle width allows the entering vehicle to travel through the route. The order in which the parked vehicles are caused to move is changed in accordance with arrangement of empty parking spaces. This allows the route to be formed efficiently.

Vehicle travel control system 100 for a parking lot according to the exemplary embodiment includes a first vehicle (e.g., parked vehicle 22), a second vehicle (e.g., entering vehicle 24), and a third vehicle (e.g., disabled vehicle 20). The first vehicle (e.g., parked vehicle 22) has a first radio communication circuit (e.g., radio communication unit 80 of parked vehicle 22), is configured to measure a first distance to an obstacle in a first direction (e.g., forward direction) along a first traveling direction (e.g., direction in which parked vehicle 22 travels) and a second distance to an obstacle in a second direction (e.g., backward direction) opposite to the first direction along the first traveling direction, and is configured to be externally controlled in traveling. The second vehicle (e.g., entering vehicle 24) has a second radio communication circuit (e.g., radio communication unit 80 of entering vehicle 24), has a given width in a direction perpendicular to a second traveling direction (e.g., traveling direction of entering vehicle 24), that is, a direction perpendicular to a traveling direction of entering vehicle 24 on a horizontal plane, that is, horizontal direction, and is configured to be externally controlled in traveling. The vehicle travel control system for a parking lot controls traveling of at least the first vehicle and the second vehicle via at least the first radio communication circuit and the second radio communication circuit. When the following conditions are satisfied, the vehicle travel control system for a parking lot causes the first vehicle to travel in a direction of moving away from the third vehicle along the first traveling direction and causes the second vehicle to travel between the first vehicle and the third vehicle.

(1-1) The first vehicle is stopped in the parking area.

(1-2) The third vehicle is stopped in the passage area adjacent to the parking area to stand still on a path in the first traveling direction in which the first vehicle travels.

(1-3) The first vehicle stopped in the parking area is in a given state (e.g., in a normal state).

(1-4) The third vehicle stopped in the passage area is not in the given state (e.g., in a disabled state).

(2-1) The first distance measured by the first vehicle is smaller than the given width of the second vehicle.

(2-2) A sum of the first distance and second distance measured by the first vehicle is larger than the given width of the second vehicle.

According to this mode, the parked vehicle is caused to move to form the route between the disabled vehicle and the parked vehicles parked near the disabled vehicle. Even if the disabled vehicle cannot move, therefore, its influence on a different vehicle can be reduced.

When the following conditions are satisfied, vehicle travel control system 100 for a parking lot may cause the first vehicle to travel a given distance in the direction of moving away from the third vehicle along the first traveling direction and then stop, and cause the second vehicle to travel between the first vehicle and the third vehicle.

(1-1) The first vehicle is stopped in the parking area.

(1-2) The third vehicle is stopped in the passage area adjacent to the parking area to stand still on the path in the first traveling direction in which the first vehicle travels.

(1-3) The first vehicle stopped in the parking area is in the given state.

(1-4) The third vehicle stopped in the passage area is not in the given state.

(2-2) A sum of the first distance and second distance measured by the first vehicle is larger than the given width of the second vehicle.

When the following conditions are satisfied, vehicle travel control system 100 for a parking lot may prevent the first vehicle from traveling in the direction of moving away from the third vehicle along the first traveling direction.

(1-1) The first vehicle is stopped in the parking area.

(1-2) The third vehicle is stopped in the passage area adjacent to the parking area to stand still on the path in the first traveling direction in which the first vehicle travels.

(1-3) The first vehicle stopped in the parking area is in the given state.

(1-4) The third vehicle stopped in the passage area is not in the given state.

(2-1) The first distance measured by the first vehicle is smaller than the given width of the second vehicle.

(2-3) The sum of the first distance and second distance measured by the first vehicle is smaller than the given width of the second vehicle.

According to vehicle travel control system 100 for a parking lot, the given state may be a state in which the vehicle is capable of traveling.

According to vehicle travel control system 100 for a parking lot, the third vehicle may have a third radio communication circuit (e.g., radio communication unit 80 of disabled vehicle 20) and may be configured to output a state of the third vehicle through the third radio communication circuit.

According to vehicle travel control system 100 for a parking lot, the third vehicle may be configured to be externally controlled in traveling.

Vehicle travel control system 100 for a parking lot may include a fourth radio communication circuit installed stationarily (e.g., a radio communication unit of entering/leaving terminal 32) and a server (e.g., management server 30) configured to communicate with the fourth radio communication circuit.

According to vehicle travel control system 100 for a parking lot, when the following conditions are satisfied, the server (e.g., management server 30) may cause the first vehicle to travel in the direction of moving away from the third vehicle along the first traveling direction and cause the second vehicle to travel between the first vehicle and the third vehicle.

(1-1) The first vehicle is stopped in the parking area.

(1-2) The third vehicle is stopped in the passage area adjacent to the parking area to stand still on the path in the first traveling direction in which the first vehicle travels.

(1-3) The first vehicle stopped in the parking area is in the given state.

(1-4) The third vehicle stopped in the passage area is not in the given state.

(2-1) The first distance measured by the first vehicle is smaller than the given width of the second vehicle.

(2-2) A sum of the first distance and second distance measured by the first vehicle is larger than the given width of the second vehicle.

According to vehicle travel control system 100 for a parking lot, the first vehicle may be provided as a plurality of vehicles (e.g., 1st parked vehicle 22a and 2nd parked vehicle 22b).

According to vehicle travel control system 100 for a parking lot, the parking area may have at least a first parking area and a second parking area, the passage area may be located between the first parking area and the second parking area, and the first vehicle may be allowed to park in at least one of the first parking area and the second parking area.

A control method of vehicle travel control system 100 for a parking lot according to the exemplary embodiment is a method of controlling the vehicle travel control system for a parking lot. Vehicle travel control system 100 for a parking lot includes the first vehicle (e.g., parked vehicle 22), the second vehicle (e.g., entering vehicle 24), and the third vehicle (e.g., disabled vehicle 20). The first vehicle (e.g., parked vehicle 22) has the first radio communication circuit (e.g., radio communication unit 80 of parked vehicle 22), is configured to measure the first distance to an obstacle in the first direction (e.g., forward direction) along the first traveling direction (e.g., direction in which parked vehicle 22 travels) and the second distance to an obstacle in the second direction (e.g., backward direction) opposite to the first direction along the first traveling direction, and is configured to be externally controlled in traveling. The second vehicle (e.g., entering vehicle 24) has the second radio communication circuit (e.g., radio communication unit 80 of entering vehicle 24), has the given width in the direction perpendicular to the second traveling direction (e.g., traveling direction of entering vehicle 24), that is, the direction perpendicular to the traveling direction of entering vehicle 24 on the horizontal plane, that is, horizontal direction, and is configured to be externally controlled in traveling. The vehicle travel control system for a parking lot controls traveling of at least the first vehicle and the second vehicle via at least the first radio communication circuit and the second radio communication circuit. When the following conditions are satisfied, the control method causes the first vehicle to travel in the direction of moving away from the third vehicle along the first traveling direction and causes the second vehicle to travel between the first vehicle and the third vehicle.

(1-1) The first vehicle is stopped in the parking area.

(1-2) The third vehicle is stopped in the passage area adjacent to the parking area to stand still on the path in the first traveling direction in which the first vehicle travels.

(1-3) The first vehicle stopped in the parking area is in the given state (e.g., in the normal state).

(1-4) The third vehicle stopped in the passage area is not in the given state (e.g., in the disabled state).

(2-1) The first distance measured by the first vehicle is smaller than the given width of the second vehicle.

(2-2) A sum of the first distance and second distance measured by the first vehicle is larger than the given width of the second vehicle.

The present disclosure has been described above according to the exemplary embodiment. It will be understood by those who are skilled in the art that the exemplary embodiment is merely an example, that various modifications of combinations of components and/or processes of the exemplary embodiment are possible, and that such modifications still fall within the scope of the present disclosure.

According to the exemplary embodiment, parked vehicle 22 measures first distance 70 and second distance 72, and second acquiring unit 56 receives first distance 70 and second distance 72 sent from parked vehicle 22. The exemplary embodiment, however, is not limited to this configuration. For example, parking lot 10 is equipped with a camera and the like, and first distance 70 and second distance 72 of each parked vehicle 22 may be derived through analysis of an image taken by the camera. Second acquiring unit 56 may receive first distance 70 and second distance 72 derived in the above manner. This modification simplifies processes carried out by parked vehicle 22.

According to the exemplary embodiment, parked vehicle 22 has its front side facing disabled vehicle 20 and receives an instruction signal instructing to move backward. The exemplary embodiment, however, is not limited to this configuration. For example, parked vehicle 22 may have its rear side facing disabled vehicle 20 and receive an instruction signal instructing to move forward. This modification improves a degree of freedom in configuring the system.

The present disclosure is usable as a vehicle travel control system for a parking lot and a control method of a vehicle travel control system for a parking lot.

What is claimed is:

1. A vehicle travel control system for a parking lot, the vehicle travel control system comprising:
   a parked vehicle stopped in a parking area, the parked vehicle including a first radio communication circuit and being configured to be externally controlled in traveling;
   an entering vehicle intending to enter the parking area, the entering vehicle including a second radio communication circuit and being configured to be externally controlled in traveling, the entering vehicle having a given vehicle width; and
   a disabled vehicle being unable to move, the disabled vehicle including a second radio communication circuit and being configured to be externally controlled in traveling,
   the parked vehicle being configured to measure a first distance to the disabled vehicle from the parked vehicle in a first direction along a first traveling direction and a second distance to an obstacle from the parked vehicle in a second direction opposite to the first direction along the first traveling direction, wherein
   the vehicle travel control system controls traveling of at least the parked vehicle and the entering vehicle through at least the first radio communication circuit and the second radio communication circuit,
   when the parked vehicle is stopped in the parking area, the disabled vehicle is stopped in a passage area adjacent to the parking area to stand still on a path in the first traveling direction in which the parked vehicle travels, the first distance measured by the parked vehicle is smaller than the given width of the entering vehicle, and a sum of the first distance and the second distance measured by the parked vehicle is larger than the given width of the entering vehicle, and the parked vehicle is caused to travel in a direction of moving away from the third disabled vehicle along the first traveling direction, and the entering vehicle is caused to travel between the parked vehicle and the disabled vehicle.

2. The vehicle travel control system for a parking lot according to claim 1, wherein when the parked vehicle is stopped in the parking area, the disabled vehicle is stopped in the passage area adjacent to the parking area to stand still on the path in the first traveling direction in which the parked vehicle travels, and the sum of the first distance and the second distance measured by the parked vehicle is larger than the given vehicle width of the entering vehicle, the parked vehicle is caused to travel the given distance in the direction of moving away from the disabled vehicle along the first traveling direction and stop, and the entering vehicle is caused to travel between the parked vehicle and the disabled vehicle.

3. The vehicle travel control system for a parking lot according to claim 1, wherein when the parked vehicle is stopped in the parking area, the disabled vehicle is stopped in the passage area adjacent to the parking area to stand still on the path in the first traveling direction in which the parked vehicle travels, the first distance measured by the parked vehicle is smaller than the given width of the entering vehicle, and the sum of the first distance and the second distance measured by the parked vehicle is smaller than the given width of the entering vehicle, the parked vehicle is prevented from traveling in the direction of moving away from the disabled vehicle along the first traveling direction.

4. The vehicle travel control system for a parking lot according to claim 1, wherein the disabled vehicle is configured to output a state of the disabled vehicle through the third radio communication circuit.

5. The vehicle travel control system for a parking lot according to claim 1, wherein the parked vehicle is provided as at least a plurality of vehicles.

6. The vehicle travel control system for a parking lot according to claim 1, wherein the parking area has at least a first parking area and a second parking area, wherein the passage area is located between the first parking area and the second parking area, and wherein the parked vehicle is allowed to park in at least one of the first parking area and the second parking area.

7. A control method of a vehicle travel control system for a parked vehicle, an entering vehicle, and a disabled vehicle in a parking lot, the parked vehicle stopped in a parking area, the parked vehicle including a first radio communication circuit and being configured to be externally controlled in traveling, an entering vehicle intending to enter the parking area, the entering vehicle including a second radio communication circuit and being configured to be externally controlled in traveling, the entering vehicle having a given vehicle width, and a disabled vehicle having developed trouble, the disabled vehicle including a second radio communication circuit and being configured to be externally controlled in traveling, the parked vehicle being configured to measure a first distance to the disabled vehicle in a first direction along a first traveling direction and a second distance to an obstacle in a second direction opposite to the first direction along the first traveling direction, and the vehicle travel control system being configured to control traveling of at least the parked vehicle and the entering vehicle through at least the first radio communication circuit and the second radio communication circuit, the control method comprising:

when the parked vehicle is stopped in the parking area, stopping the disabled vehicle in a passage area adjacent to the parking area to stand still on a path in the first traveling direction in which the parked vehicle travels, wherein the first distance measured by the parked vehicle is smaller than the given width of the entering vehicle, and a sum of the first distance and the second distance measured by the parked vehicle is larger than the given vehicle width of the entering vehicle;

causing the parked vehicle to travel in a direction of moving away from the disabled vehicle along the first traveling direction; and causing the entering vehicle to travel between the parked vehicle and the disabled vehicle.

8. The control method of the vehicle travel control system for a parking lot according to claim 7, comprising:

when the parked vehicle is stopped in the parking area, the disabled vehicle is stopped in the passage area adjacent to the parking area to stand still on the path in the first traveling direction in which the parked vehicle travels, and the sum of the first distance and the second distance measured by the parked vehicle is larger than the given width of the entering vehicle, causing the parked vehicle to travel the given distance in the direction of moving away from the disabled vehicle along the first traveling direction and stop; and causing the entering vehicle to travel between the parked vehicle and the disabled vehicle.

9. The control method of the vehicle travel control system for a parking lot according to claim 7, comprising:

when the parked vehicle is stopped in the parking area, the disabled vehicle is stopped in the passage area adjacent to the parking area to stand still on the path in the first traveling direction in which the parked vehicle travels, the first distance measured by the parked vehicle is smaller than the given width of the entering vehicle, and the sum of the first distance and the second distance measured by the parked vehicle is smaller than the given width of the entering vehicle, preventing the parked vehicle from traveling in the direction of moving away from the disabled vehicle along the first traveling direction.

10. The control method of the vehicle travel control system for a parking lot according to claim 7, wherein the disabled vehicle is configured to output a state of the disabled vehicle through the third radio communication circuit.

11. The control method of the vehicle travel control system for a parking lot according to claim 7, wherein the parked vehicle is provided as at least a plurality of vehicles.

12. The control method of the vehicle travel control system for a parking lot according to claim 7, wherein
- the parking area has at least a first parking area and a second parking area, wherein
- the passage area is located between the first parking area and the second parking area, and wherein
- the parked vehicle is allowed to park in at least one of the first parking area and the second parking area.

13. A vehicle travel control system for a parked vehicle, an entering vehicle, and a disabled vehicle in a parking lot,
- the parked vehicle stopped in a parking area, the parked vehicle including a first radio communication circuit and being configured to be externally controlled in traveling,
- the entering vehicle intending to enter the parking area, the entering vehicle including a second radio communication circuit and being configured to be externally controlled in traveling, the entering vehicle having a given vehicle width,
- the disabled vehicle being unable to move, the disabled vehicle including a second radio communication circuit and being configured to be externally controlled in traveling, and
- the parked vehicle being configured to measure a first distance to the disabled vehicle in a first direction along a first traveling direction and a second distance to an obstacle in a second direction opposite to the first direction along the first traveling direction, the vehicle travel control system comprising:
- a fourth radio communication circuit installed stationarily; and
- a server configured to communicate with the fourth radio communication circuit, wherein:
- the server controls traveling of at least the parked vehicle and the entering vehicle through at least the first radio communication circuit and the second radio communication circuit,
- when the parked vehicle is stopped in the parking area, the disabled vehicle is stopped in a passage area adjacent to the parking area to stand still on a path in the first traveling direction in which the parked vehicle travels the first distance measured by the parked vehicle is smaller than the given vehicle width of the entering vehicle, and a sum of the first distance and the second distance measured by the parked vehicle is larger than the given vehicle width of the entering vehicle, and
- the parked vehicle is caused to travel in a direction of moving away from the disabled vehicle along the first traveling direction, and the entering vehicle is caused to travel between the parked vehicle and the disabled vehicle.

\* \* \* \* \*